United States Patent
Kaji et al.

(10) Patent No.: US 9,834,869 B2
(45) Date of Patent: Dec. 5, 2017

(54) FLAME-RESISTANT HEAT TREATMENT FURNACE

(71) Applicant: Mitsubishi Chemical Corporation, Tokyo (JP)

(72) Inventors: Satoshi Kaji, Hiroshima (JP); Nobuyuki Yamamoto, Aichi (JP); Atsushi Kawamura, Hiroshima (JP); Hitoshi Tomobe, Hiroshima (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 14/853,138

(22) Filed: Sep. 14, 2015

(65) Prior Publication Data
US 2016/0002828 A1 Jan. 7, 2016

Related U.S. Application Data

(63) Continuation of application No. 14/235,724, filed as application No. PCT/JP2012/068914 on Jul. 26, 2012, now Pat. No. 9,157,679.

(30) Foreign Application Priority Data

Jul. 28, 2011 (JP) ................................ 2011-165816

(51) Int. Cl.
*F27B 9/28* (2006.01)
*C21D 9/56* (2006.01)
(Continued)

(52) U.S. Cl.
CPC ............... *D01F 9/32* (2013.01); *C01B 31/02* (2013.01); *D01F 9/14* (2013.01); *D02J 13/001* (2013.01);
(Continued)

(58) Field of Classification Search
CPC .............. F27B 9/28; C21D 9/56; C21D 9/561
(Continued)

(56) References Cited

U.S. PATENT DOCUMENTS 3,272,415 A * 9/1966 Wallin .................... B65G 51/03
242/615.11
3,979,038 A * 9/1976 Karlsson ................ B65H 23/24
242/615.11
(Continued)

FOREIGN PATENT DOCUMENTS

| JP | 10 205416 | 8/1998 |
| JP | 10 237723 | 9/1998 |

(Continued)

OTHER PUBLICATIONS

Ryutai Rikigaku Handbook, Maruzen Co., Ltd., pp. 803 to 809, (Jul. 20, 1987).
(Continued)

*Primary Examiner* — Gregory A Wilson
(74) *Attorney, Agent, or Firm* — Oblon, McClelland, Maier & Neustadt, L.L.P.

(57) ABSTRACT

To perform a flame-resistant treatment on a precursor fiber strand by sending hot air to a heat treatment chamber (2) through a hot air blowing nozzle (4) in a direction parallel to a running direction of a precursor fiber strand (10). The hot air blowing from the hot air blowing nozzle (4) passes through a porous plate and a rectifying member that satisfy the following conditions (1) to (4), wherein the conditions are set as follows: (1) A/B≥4.0; (2) 0.15≤α≤0.35; (3) 0≤B−d≤20; and (4) 80% or more of an area of one opening of the porous plate when causing facing surfaces of the porous plate and the rectifying member to overlap each other is included in one opening of the rectifying member, A indicating a hot air passage distance (mm) of the rectifying member, B indicating a horizontal maximum distance (mm)

(Continued)

of one opening of the rectifying member, α indicating a rate of hole area of the porous plate, and d indicating an equivalent diameter (mm) of the porous plate. Accordingly, it is possible to provide a parallel stream type flame-resistant heat treatment furnace having exhibiting the uniform heat transfer performance throughout the inside of the heat treatment chamber by preventing the blockage of the nozzle caused by a silicone compound generated inside the heat treatment chamber even in the hot air blowing nozzle having a simple structure.

20 Claims, 4 Drawing Sheets

(51) Int. Cl.
*D01F 9/32* (2006.01)
*C01B 31/02* (2006.01)
*F26B 13/00* (2006.01)
*F26B 13/10* (2006.01)
*D02J 13/00* (2006.01)
*D01F 9/14* (2006.01)
*D06B 5/06* (2006.01)

(52) U.S. Cl.
CPC .............. *D06B 5/06* (2013.01); *F26B 13/001* (2013.01); *F26B 13/108* (2013.01)

(58) Field of Classification Search
USPC .......... 432/8, 59; 264/173.14, 173.15, 210.7, 264/235.8, 290.2; 34/635, 638, 643
See application file for complete search history.

(56) References Cited

U.S. PATENT DOCUMENTS

| | | | | |
|---|---|---|---|---|
| 5,471,766 | A * | 12/1995 | Heikkila | F26B 13/104 34/461 |
| 5,908,290 | A * | 6/1999 | Kawamura | D01F 9/32 34/636 |
| 6,027,337 | A * | 2/2000 | Rogers | D01F 9/32 432/242 |
| 6,776,611 | B1 * | 8/2004 | Sprague | D01F 9/32 432/242 |
| 7,335,018 | B2 * | 2/2008 | Yamaguchi | D01F 9/32 432/59 |
| 2004/0214124 | A1 * | 10/2004 | Stockhausen | D01F 9/32 432/59 |

FOREIGN PATENT DOCUMENTS

| | | |
|---|---|---|
| JP | 2002 194627 | 7/2002 |
| JP | 2008 144293 | 6/2008 |
| JP | 2010 133059 | 6/2010 |

OTHER PUBLICATIONS

International Search Report Issued Sep. 4, 2012 in PCT/JP12/68914 Filed Jul. 26, 2012.

Extended European Search Report dated Nov. 14, 2014 in Patent Application No. 12818099.9.

* cited by examiner

FLAME-RESISTANT HEAT TREATMENT FURNACE

TECHNICAL FIELD

The present invention relates to a flame-resistant heat treatment furnace that is appropriately used to manufacture a carbon fiber.

BACKGROUND ART

As a method of manufacturing a carbon fiber, a method is widely known in which a precursor fiber of a carbon fiber is subjected to a flame-resistant treatment and a carbonizing treatment.

As the flame-resistant treatment used to manufacture the carbon fiber, for example, a method is widely employed in which a heat treatment is performed on the precursor fiber inside a heat treatment chamber in an oxidization atmosphere by hot air.

Incidentally, since the flame-resistant treatment is a treatment that accompanies an exothermal reaction, it is important to suppress a variation in reaction by keeping the uniform heat transfer performance throughout the inside of the heat treatment chamber.

Therefore, according to JP 10-237723 A (Patent Document 1), a heat treatment chamber through which a precursor yarn passes is provided with a blowing port that blows hot air in a direction following a precursor yarn passage path, and a cross-sectional area Ss of the heat treatment chamber and a cross-sectional area Sf of the blowing port in a direction perpendicular to the precursor yarn passage path have a relation of Ss/Sf≤2, so that a satisfactory parallel stream is formed along the yarn passage path. Further, according to JP 2002-194627 A (Patent Document 2), there is disclosed a nozzle in which a hot air introduction region is formed by a guide vane, a porous plate, and a rectifying plate, dimensions of respective portions inside a heat treatment furnace are defined by a predetermined relation, and a uniform blowing wind speed distribution is set so that hot air blows in parallel to a yarn.

Furthermore, according to a flame-resistant furnace disclosed in JP 2008-144293 A (Patent Document 3), the flame-resistant furnace includes a gas introduction portion that causes an oxidizing atmosphere gas to blow in a direction substantially perpendicular to a running direction of a polyacrylonitrile-based fiber bundle and a gas discharge portion that is installed to face the gas introduction portion and discharges the oxidizing atmosphere gas, and the gas introduction portion is provided with a porous plate having an opening with a circle of a diameter of 10 mm in consideration of a blockage of a hot air nozzle.

CITATION LIST

Patent Document

Patent Document 1: JP 10-237723 A
Patent Document 2: JP 2002-194627 A
Patent Document 3: JP 2008-144293 A

DISCLOSURE OF THE INVENTION

Problem to be Solved by the Invention

However, in the flame-resistant furnace disclosed in Patent Document 1, it is mentioned that a variation in the wind speed of the hot air blowing from the blowing port of the nozzle needs to be within ±10%. However, only the components thereof are illustrated, and the detailed dimensions of the components and the relation of the components are not mentioned.

Further, in the flame-resistant furnace disclosed in Patent Document 2, the rectifying region is formed as multiple stages in order to reduce a variation in wind speed. For this reason, the pressure loss increases, and the length of the nozzle in the yarn direction increases. Accordingly, since there is an increase in the size of the region where the hot air does not flow in the flame-resistant furnace, it is not possible to remove the heat of the precursor fiber that keeps the exothermal reaction. Thus, the risk of a runaway reaction increases.

Even in the carbon fiber manufacturing process, since the flame-resistant treatment causes the oxidation reaction that generates the heat of the precursor fiber bundle, single fibers may be easily fused due to the hot air inside the flame-resistant furnace or the heat generated by the oxidation reaction. The flame-resistant fiber bundle having the fused single fibers noticeably degrades the quality of the carbon fiber. For example, in the subsequent carbonizing treatment, the yarn is easily fluffy or cut and various characteristics of the yarn may be easily degraded.

In order to prevent the fusion of the flame-resistant fiber bundle, for example, a method of applying oil to the precursor fiber bundle is known, and various kinds of oil have been examined using the above-described method. Among these, silicon oil is frequently used in that the oil has high thermal resistance and effectively suppresses the fusion. However, the silicone oil applied to the precursor fiber bundle is partially volatilized by the high heat of the flame-resistant treatment, and easily stays in the hot air.

When the dust stays inside the flame-resistant furnace, the wind speed rectifying porous plate installed in the blowing surface of the hot air blowing port is blocked, so that the hot air may not be circulated. When the hot air may not be circulated inside the heat treatment chamber, the heat of the precursor fiber bundle may not be sufficiently removed, and the yarn of the precursor fiber bundle is cut. The precursor fiber bundle of which the yarn is cut is further tangled with the other precursor fiber bundles, so that the yarns of the precursor fiber bundles running in the other running regions are cut. As a result, a fire takes place in the worst case, and hence the cut yarns disturb the stable operation of the flame-resistant furnace.

In view of such circumstances, a rectifying technique is disclosed which uses the porous plate having the opening with the circle of 10 mm as the component of the hot air nozzle disclosed in Patent Document 3. However, in the flame-resistant furnace that supplies the hot air to the precursor fiber strand in the perpendicular direction at the blowing wind speed of 0.3 m/s to 1.5 m/s, when the wind speed is uniformly controlled and the air blowing amount increases, the precursor fiber strand is easily cut, so that the adjacent fibers are frequently tangled.

An object of the invention is to provide a parallel stream type flame-resistant furnace that is appropriately used to manufacture carbon fiber having large total fiber fineness, obtains high productivity from high heat transfer performance with an increase in treatment speed, and performs a heat-resistant treatment on a running precursor fiber by supplying hot air in a direction parallel to the running direction, where a structure of a hot air nozzle becomes simple and a hot air blowing speed distribution becomes uniform while using a component having a large opening so as to prevent a blockage of a nozzle particularly caused by a silicone compound, so that the heat transfer performance may become uniform throughout the inside of the heat treatment chamber.

Means for Solving Problem

The invention includes the following aspects.

[1] A flame-resistant heat treatment furnace including:
a heat treatment chamber that causes hot air to flow in a direction parallel to a running direction of a precursor fiber strand and heats the precursor fiber strand;
a hot air blowing nozzle that introduces the hot air into the heat treatment chamber; and
a hot air suctioning nozzle that is installed at a position away from the hot air blowing nozzle and suctions the hot air,
wherein the hot air blowing nozzle includes a porous plate and a rectifying member that satisfy the following conditions (1) to (4), and the hot air is sent to the heat treatment chamber through the porous plate and the rectifying member, and
wherein the conditions are set as follows:
(1) $A/B \geq 4.0$;
(2) $0.15 \leq \alpha \leq 0.35$;
(3) $0 \leq B-d \leq 20$; and
(4) 80% or more of an area of one opening of the porous plate when causing facing surfaces of the porous plate and the rectifying member to overlap each other is included in one opening of the rectifying member, A indicating a hot air passage distance (mm) of the rectifying member, B indicating a horizontal maximum distance (mm) of one opening of the rectifying member, $\alpha$ indicating a rate of hole area of the porous plate, and d indicating an equivalent diameter (mm) of the porous plate.

[2] In the above-described flame-resistant heat treatment furnace, the equivalent diameter d (mm) of the porous plate may satisfy a condition (5) of $10 \leq d \leq 20$.

[3] In the above-described flame-resistant heat treatment furnace, an opening pitch P1 (mm) of openings of the porous plate and an opening pitch P2 (mm) of openings of the rectifying member may satisfy a condition (6) of $0.995 \times P2 \leq P1 \leq 1.005 \times P2$.

[4] In the above-described flame-resistant heat treatment furnace, a distance y (mm) between the facing opening surfaces of the porous plate and the rectifying member may satisfy a condition (7) of $0 \leq y \leq 7$.

[5] In the above-described flame-resistant heat treatment furnace, a cross-sectional shape of the rectifying member in the hot air passage direction may be a lattice shape or a honeycomb shape.

[6] In the above-described flame-resistant heat treatment furnace, the porous plate and the rectifying member may be connected to each other by a positioning member at a connection portion.

[7] In the above-described flame-resistant heat treatment furnace, the porous plate and the rectifying member may be detachable from each other.

[8] In the above-described flame-resistant heat treatment furnace, the hot air blowing nozzle may include a direction changing plate that changes a hot air flow direction, and may satisfy a condition (8) of $(x/L)<0.030$ and a condition (9) of $(w/L)<0.50$, x indicating a distance (mm) between the porous plate at a nozzle tip and the direction changing plate at the nozzle tip, L indicating an entire length (mm) of the hot air blowing nozzle in the depth direction, and w indicating an inlet width (mm) of the hot air blowing nozzle.

[9] In the above-described flame-resistant heat treatment furnace, an installation position of the porous plate may be adjustable.

[10] A method of manufacturing a carbon fiber including: heating a carbon fiber precursor strand by using the flame-resistant heat treatment furnace.

Effect of the Invention

According to the invention, since the hot air blowing speed distribution becomes uniform by the simple hot air blowing nozzle structure during the flame-resistant treatment, the heat transfer performance may become uniform throughout the inside of the heat treatment chamber. Further, since the porous plate having a large opening is used, the blockage of the nozzle caused by a silicone compound may be easily prevented.

BEST MODE(S) FOR CARRYING OUT THE INVENTION

Hereinafter, an exemplary embodiment of the invention will be described with reference to the drawings.

Figure 1:
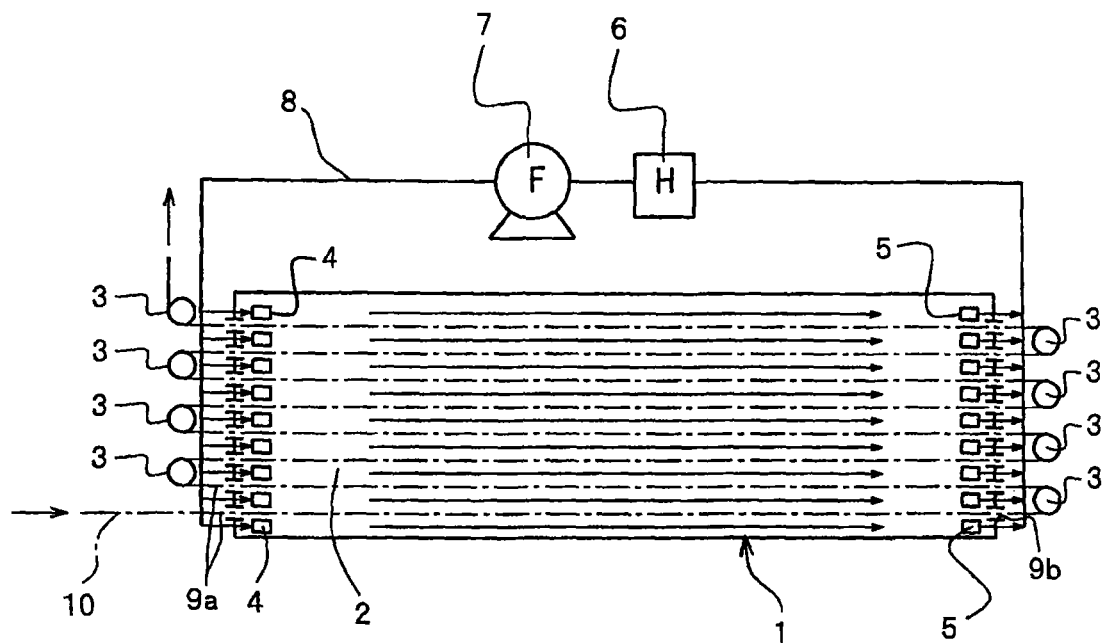
FIG. 1 is a side cross-sectional view schematically illustrating a structure of a representative flame-resistant heat treatment furnace according to this embodiment.

FIG. 1 schematically illustrates a longitudinal sectional view of a flame-resistant heat treatment furnace of this embodiment. A flame-resistant heat treatment furnace 1 of this embodiment includes a heat treatment chamber 2 that is disposed inside the flame-resistant heat treatment furnace 1, first guide ports 9a that are formed in a slit shape and are used to introduce a precursor fiber strand 10 running in a sheet shape into the heat treatment chamber 2 or draw the precursor fiber strand to the outside of the heat treatment chamber 2, second guide ports 9b that are formed in a slit shape and are used to draw the precursor fiber strand 10 running in a sheet shape to the outside of the heat treatment chamber 2 or introduce the precursor fiber strand into the heat treatment chamber 2, hot air blowing nozzles 4 that are disposed at the interior side of the first guide port 9a of the precursor fiber strand 10, hot air suctioning nozzles 5 that are disposed at the interior side of the second guide ports 9b of the precursor fiber strand 10, guide rolls 3 that are installed at the upper and lower stages of the first and second guide ports 9a and 9b of the precursor fiber strand 10 at the outside of the heat treatment chamber 2, a circulation duct 8 that circulates hot air in the hot air blowing nozzles 4, the heat treatment chamber 2, and the hot air suctioning nozzles 5, and a hot air heater 6 and an air blower 7 that are installed in the circulation duct 8. The sheet-shaped precursor fiber strand 10 is sequentially hung and wound around the guide rolls 3 disposed as plural stages, and is guided into or out of the heat treatment chamber 2 through the first and second guide ports 9a and 9b of the flame-resistant heat treatment furnace 1.

Figure 2:
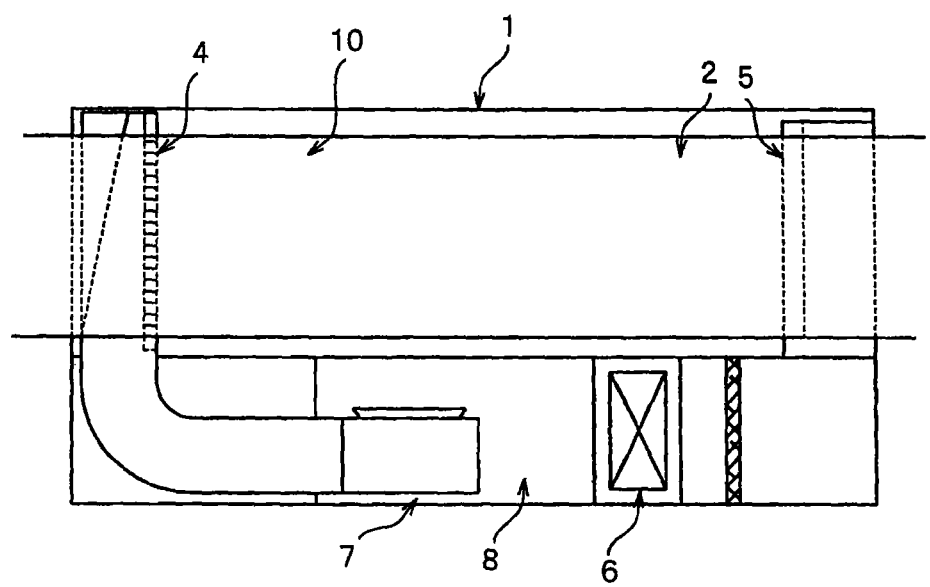
FIG. 2 is a top cross-sectional view schematically illustrating the inside of the flame-resistant heat treatment furnace.

FIG. 2 illustrates a top cross-sectional view of the flame-resistant heat treatment furnace according to this embodiment. As illustrated in the same drawing, the hot air that blows from the hot air blowing nozzle 4 flows into the heat treatment chamber 2 in parallel to plural precursor fiber strands 10 that run while being flat in a sheet shape, is suctioned by the hot air suctioning nozzles 5, passes through the circulation duct 8 so that the temperature is controlled at a predetermined temperature by the hot air heater 6, and is supplied to the hot air blowing nozzle 4 again by the air blower 7.

Figure 3:
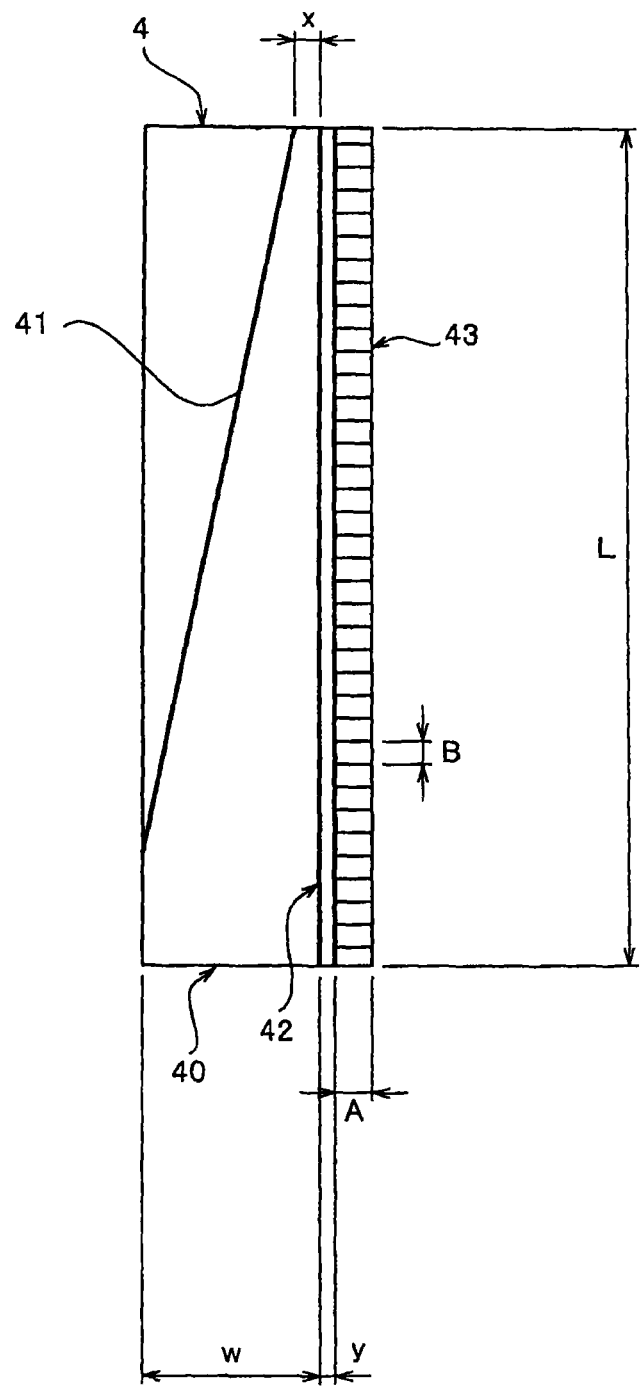
FIG. 3 is an enlarged top view schematically illustrating a structure of a hot air blowing nozzle.

FIG. 3 illustrates an enlarged top view of the hot air blowing nozzle 4 that is provided in the flame-resistant heat treatment furnace of the invention. The hot air blowing nozzle 4 has a rectangular cross-section, and includes a hot air inlet 40, a direction changing plate 41 that changes the direction of the hot air by 90°, a porous plate 42 that reduces a variation in wind speed caused by pressure loss, and a rectifying member 43 that trims the hot air in a direction in which the precursor fiber strand 10 runs in the heat treatment chamber 2 (see FIG. 2).

In the invention, the porous plate 42 is a plate provided with plural openings.

It is desirable that plural openings having the same shape and size be uniformly arranged in the porous plate 42.

It is desirable that the air blowing speed of the hot air blowing from each of the hot air blowing nozzles 4 disposed at the upper and lower positions with the precursor fiber strand 10 interposed there between be the same speed. Further, it is desirable to decrease a variation in flow speed of the hot air blowing from the hot air blowing nozzles 4 in the width direction and the height direction as small as possible, and it is desirable that a variation in wind speed at the point of 2 m on the downstream side of the air blowing nozzle fall within the average wind speed ±20%. It is more desirable that a variation in wind speed fall within the average wind speed ±10%.

It is desirable that a ratio (A/B) between a hot air passage distance A (see FIG. 3) in which the hot air passes through the rectifying member 43 and a maximum distance B of the rectifying member 43 in the horizontal direction be equal to or larger than four. When the ratio is equal to or larger than 4.0, the hot air may have a desirable linear advancing property that causes the hot air changing in direction from the hot air inlet 40 of the hot air blowing nozzle 4 to blow in parallel to the running direction of the precursor fiber strand 10. Meanwhile, when the rectifying member 43 is formed with a long length, the length of the nozzle increases in the yarn direction, and hence a region increases which sandwiches the precursor fiber strand 10 in the flame-resistant heat treatment furnace 1 and disturbs the flow of the hot air. That is, heat may not be removed from the precursor fiber strand 10 that repeats an exothermal reaction according to the design, and hence the risk of a runaway reaction increases. The ratio A/B is desirably 10 or less, more desirably 7 or less, and most desirably 5 or less.

Further, the rate of hole area of the porous plate 42 is 15 to 35% in order to reduce a variation in wind speed caused by the pressure loss. It is desirable that the rate of hole area be equal to or larger than 15% in that the pressure loss is suppressed at the position of the porous plate, and it is more desirable that the rate of hole area be equal to or larger than 17%. It is desirable that the rate of hole area be equal to or smaller than 35% in that a variation in wind speed is reduced by the pressure loss in the length direction of the hot air blowing nozzle 4. Further, the rate of hole area of 30% or less is more desirable, and the rate of hole area of 25% or less is most desirable.

As for the positional relation between one opening of the porous plate 42 and one opening of the rectifying member 43, it is desirable that 80% or more of the area of one opening of the porous plate 42 exist within one opening of the rectifying member 43 when the facing surfaces of the porous plate 42 and the rectifying member 43 overlap each other in that the hot air blowing speed from the hot air blowing nozzle 4 becomes uniform.

It is desirable that the opening center of the porous plate 42 exist on the line connected to the middle point of the rectifying member 43 in the width direction.

With the positional relation, the hot air may smoothly flow through the porous plate 42 and the rectifying member 43, and hence the gradient stream may be also easily suppressed.

The diameter d equivalent to the opening of the porous plate 42 in the invention may be appropriately determined from the blockage state of the porous plate 42 and the uniform hot air blowing speed of the hot air blowing nozzle 4. However, from the viewpoint of preventing the blockage of the porous plate 42, the lower limit of the equivalent diameter of the porous plate 42 is desirably 5 mm or more, more desirably 8 mm or more, and most desirably 10 mm or more.

Further, the upper limit of the equivalent diameter of the porous plate 42 is desirably 25 mm or less, more desirably 20 mm or less, and most desirably 16 mm or less from the viewpoint of the uniform hot air blowing speed from the hot air blowing nozzle 4.

The equivalent diameter d is obtained by the following equation.

$$d = 4 \times S/L$$

Here, S indicates the opening area ($mm^2$) and L indicates the opening perimeter (mm).

In the invention, it is desirable that the relation between the maximum distance B (mm) of one opening of the rectifying member 43 in the horizontal direction and the equivalent diameter d (mm) of the porous plate 42 satisfy the condition of $0 \leq B - d \leq 20$.

When the value obtained by subtracting the equivalent diameter d (mm) of the porous plate 42 from the maximum distance B (mm) of one opening of the rectifying member 43 in the horizontal direction is 0 (mm) or more, the hot air may smoothly flow through the rectifying member 43. Further, when the value obtained by subtracting the equivalent diameter d (mm) of the porous plate 42 from the maximum distance B (mm) of one opening of the rectifying member 43 in the horizontal direction is 20 (mm) or less, the linear advancing property of the hot air blowing to the heat treatment chamber may be easily improved.

It is desirable that the value obtained by subtracting the equivalent diameter d (mm) of the porous plate 42 from the maximum distance B (mm) of one opening of the rectifying member 43 in the horizontal direction be 5 (mm) or more in that the hot air smoothly flow through the rectifying member 43. Further, it is more desirable that the value obtained by subtracting the equivalent diameter d (mm) of the porous plate 42 from the maximum distance B (mm) of one opening of the rectifying member 43 in the horizontal direction be 15 (mm) or less from the viewpoint of the linear advancing property of the hot air.

Figure 5:
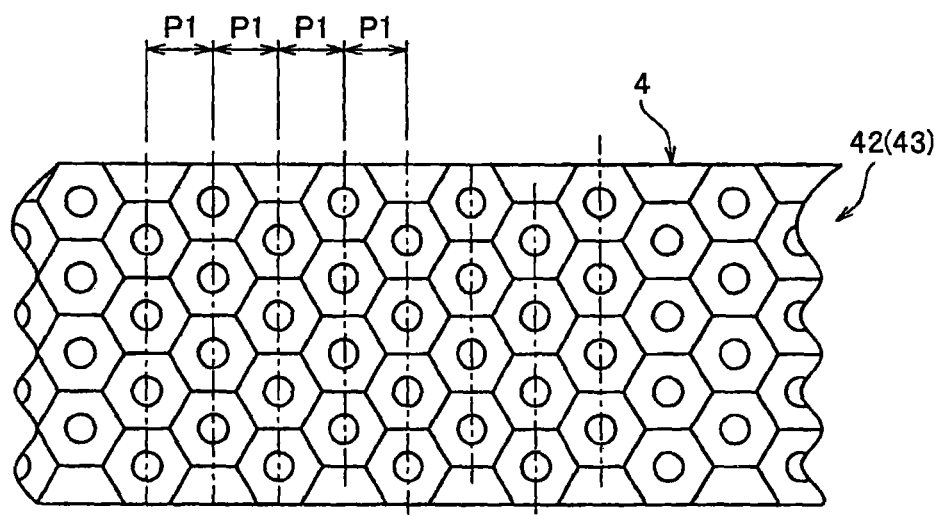
FIG. 5 is a front view schematically illustrating a state where opening centers of the porous plate and the rectifying member of the hot air blowing nozzle match one another when viewed from the rectifying member.
Figure 6:
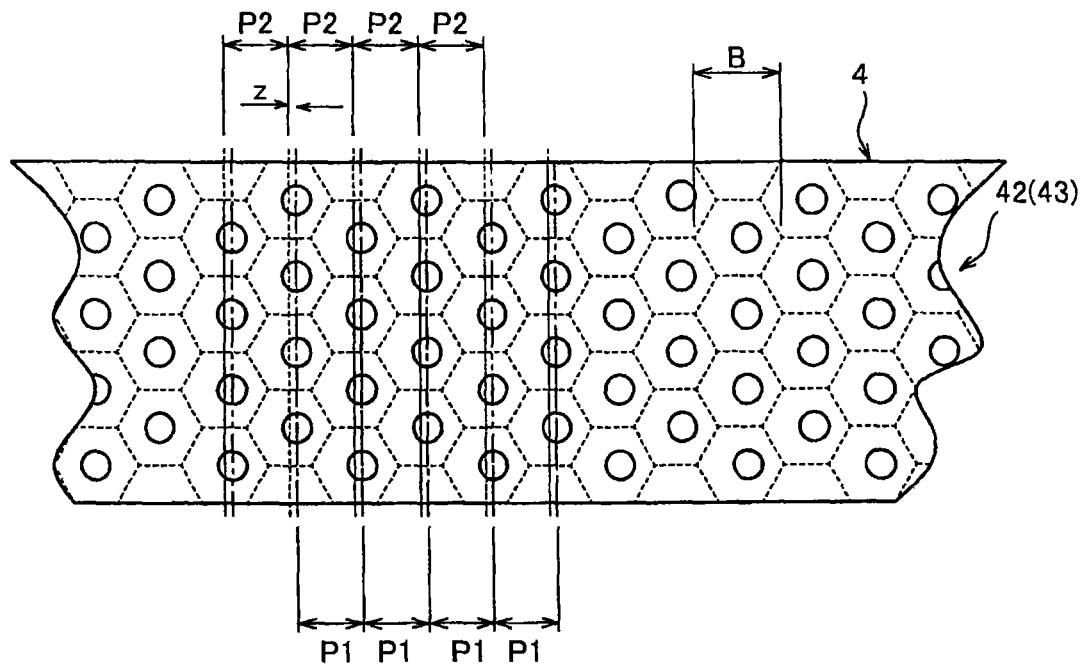
FIG. 6 is a front view schematically illustrating a state where opening positions of the porous plate and the rectifying member of the hot air blowing nozzle of the flame-resistant heat treatment furnace of the invention are displaced from one another when viewed from the porous plate.

As the rectifying member 43, a rectifying plate obtained by arranging flat plates in parallel, a honeycomb member obtained in the market, or a member obtained by the combination of flat plates in a lattice shape are used. In order to obtain the uniform blowing speed between the rectifying members 43 inside the heat treatment chamber 2 in the width direction, it is desirable that the opening pitch P1 of the opening of the porous plate 42 be in the range of 0.995 to 1.005 times of the opening pitch P2 of the opening of the rectifying member. When the opening pitch becomes smaller than 0.995 times, the displacement amount of the relative position between the opening of the porous plate 42 and the opening of the rectifying member 43 increases, and hence there is a concern that the wind speed distribution in the width direction inside the heat treatment chamber 2 may be degraded. Further, even when the opening pitch becomes larger than 1.005 times, the displacement directions become opposite to each other, and hence there is a concern that the wind speed distribution may be degraded in the same way. More desirably, the opening pitch P2 of the rectifying member and the opening pitch P1 of the porous plate are equal to each other as illustrated in FIG. 5.

The shape of the direction changing plate 41 has an inclination set in the range in which the ratio (x/L) of the facing distance x between the direction changing plate 41 and the porous plate 42 of the tip in the nozzle length direction with respect to the length L of the hot air blowing nozzle 4 is smaller than 0.030 times and the ratio (w/L) of the inlet width w of the hot air blowing nozzle 4 with respect to the nozzle length L of the hot air blowing nozzle 4 is smaller than 0.50 times (see FIG. 3). By the inclination set in this range, the direction of the hot air may be changed and the flow amount from the hot air inlet 40 to the nozzle tip is controlled. Accordingly, the air blowing speed may become uniform throughout the nozzle length L.

Figure 4:
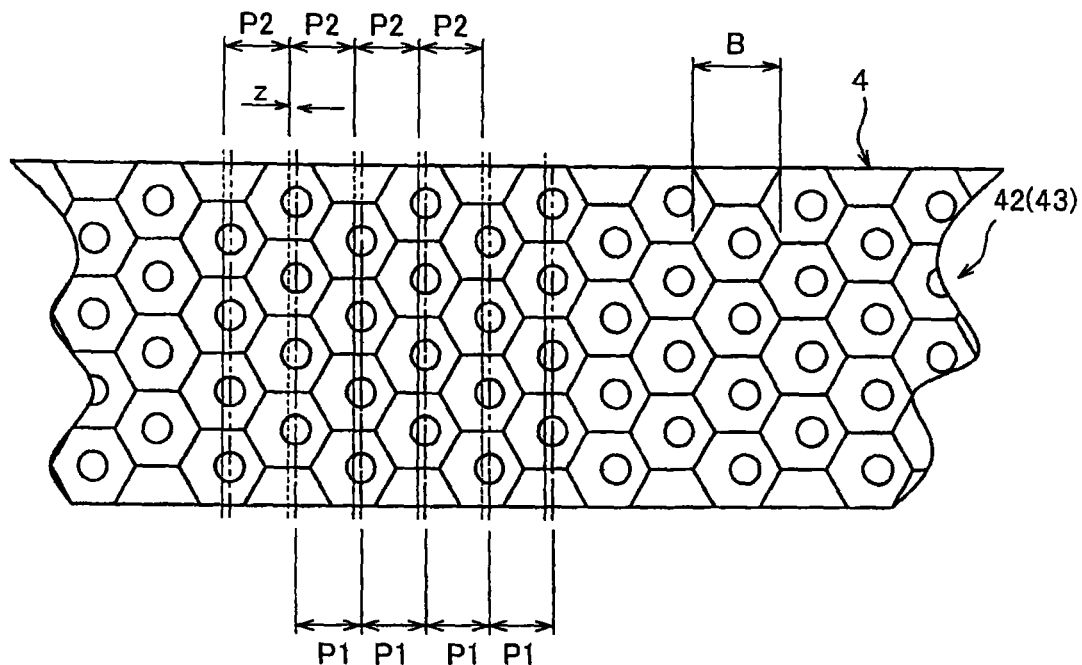
FIG. 4 is a front view schematically illustrating a displacement of openings of a porous plate and a rectifying member of the hot air blowing nozzle when viewed from the rectifying member.

FIG. 4 schematically illustrates the positional relation between the porous plate 42 and the rectifying member 43 of the hot air blowing nozzle 4.

It is desirable that the facing distance y (see FIG. 3) between the opening surfaces of the porous plate 42 and the rectifying member 43 be within 7 mm. At the position where the hot air immediately passes through the porous plate, the direction of the hot air is not parallel to the running direction of the precursor fiber strand 10, and the stream line is inclined. For this reason, it is desirable that the distance y between the porous plate 42 and the rectifying member 43 be within 7 mm in that the influence of the inclination of the stream line at the tip side of the hot air blowing nozzle 4 in the length direction is suppressed and the air blowing speed distribution of the hot air is uniform.

Further, it is desirable that the distance y between the porous plate 42 and the rectifying member 43 having a lattice shape or a honeycomb shape be close to 0 as much as possible.

In order to keep the relative positional relation between the porous plate 42 and the rectifying member 43, the connection there between is performed by using a positioning member. Any method may be employed as long as the positional relation between the rectifying member and the porous plate is uniformly fixed so that the hot air blowing operation is not influenced. For example, exemplified are a method of fixing the porous plate 42 to the rectifying member 43 without any displacement in the width direction inside the heat treatment chamber 2 by uprightly setting a positioning pin having a width equal to the gap of the rectifying member adjacent to the porous plate 42 and inserting the rectifying member 43, a method of inserting the outer frame of the porous plate to the outer frame of the rectifying member, a method of fixing the porous plate to the rectifying member by a bolt and a nut, a method of inserting protrusions having the same shape as that of the openings of the rectifying member mounted on the porous plate to the several openings of the rectifying member, and a method of installing a hook to a designated place. Further, it is desirable that the connection member be detachable for the convenience of maintenance.

Figure 7:
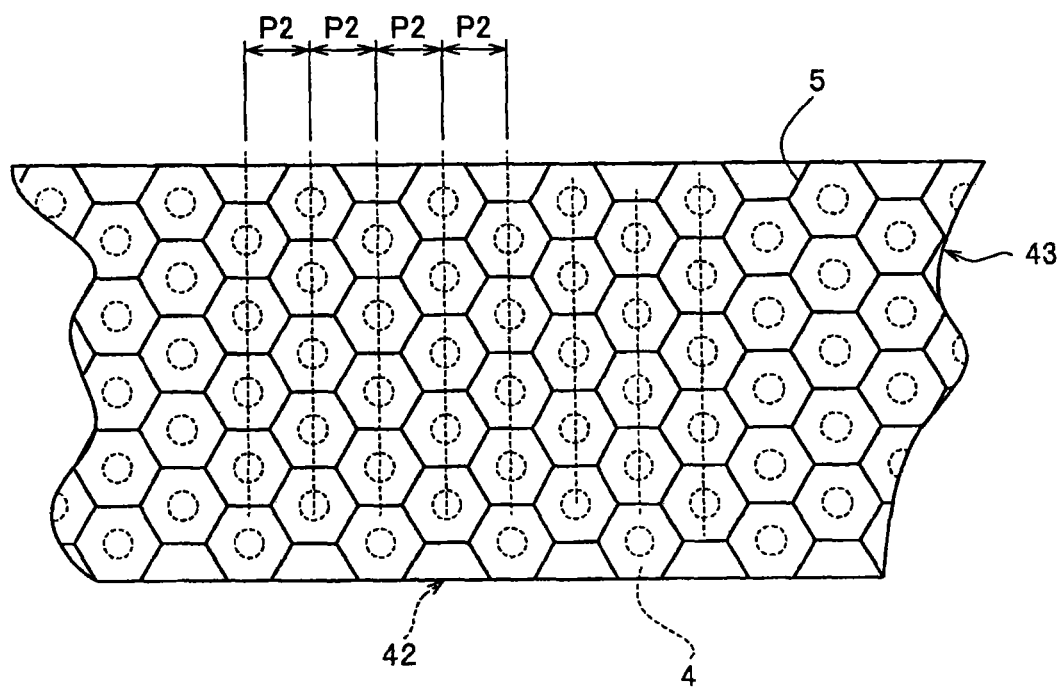
FIG. 7 is a front view schematically illustrating a method of opening the porous plate of the hot air blowing nozzle of the flame-resistant heat treatment furnace of the invention.

FIG. 7 schematically illustrates a method of opening the porous plate of the hot air blowing nozzle. The number of the holes of the porous plate 42 does not need to be essentially equal to the number of holes of the rectifying member 43 having a lattice shape or a honeycomb shape, and the hole forming positions of the porous plate 42 may be arbitrarily set in order to cause the rate of hole area to fall within a predetermined range. At this time, it is desirable to form the hole forming positions of the porous plate 42 so as to be balanced as a whole.

As described above, according to the flame-resistant heat treatment furnace using the hot air blowing nozzle of the invention, the structure of the hot air blowing nozzle may be simplified, and the heat transfer performance throughout the inside of the heat treatment chamber may become uniform by obtaining the uniform distribution of the air blowing speed of the hot air. Further, the blockage of the nozzle caused by a silicone compound may be easily prevented by using a member having a large opening.

Further, when the flame-resistant heat treatment furnace has the configuration of FIG. 2 such that the circulation duct 8 is disposed so as to be symmetrical in the width direction of the precursor fiber bundle (the precursor fiber strand) 10 while being located at the outside, the width of the treatment subject passage path is set to be large, and the hot air blowing nozzles 4 are disposed while being symmetrical in the length direction so as to arrange the backs thereof in a line, the treatment amount per unit time may be increased while keeping the uniform flow speed distribution.

EXAMPLES

Hereinafter, examples of the invention will be described in detail. However, the invention is not limited to these examples.

The measurement method is as below.

(Wind Speed)

The wind speed inside the flame-resistant heat treatment furnace was measured by a vane wind speed meter (trade name: "SK-95 F" manufactured by SATO CO., LTD.).

Example 1

In the hot air blowing nozzle illustrated in FIG. 3, the nozzle length L was set as 2050 mm, the width w of the hot air inlet was set as 700 mm, the distance x between the tip of the direction changing plate and the porous plate was set as 50 mm, and the equivalent diameter d of the porous plate was set as 12 mm. At this time, the ratio w/L of the width w of the hot air inlet with respect to the length L of the hot air blowing nozzle was set as 0.34, and the ratio x/L of the distance x between the tip of the direction changing plate and the porous plate with respect to the length L of the hot air blowing nozzle was set as 0.024.

Further, a stainless honeycomb (having a trade name "SH-01100-26", an opposite side dimension of 26 mm, a plate thickness of 0.1 mm, and a depth of 145 mm) manufactured by San Technology, Inc. was used as the rectifying member. That is, the ratio A/B was 4.8%. At this time, the opening pitch P1 of the holes of the porous plate illustrated in FIG. 4 was set as the pitch of 22.5 mm equal to the opening pitch P2 of the stainless honeycomb. At this time, the rate of hole area was 17%. Further, as illustrated in FIG. 5, the center positions of the openings of the porous plate and the rectifying member were adjusted so as to match one another when the porous plate and the rectifying member overlapped each other. Further, the porous plate and the rectifying member were closely attached to each other so that the gap y became 0 mm.

Hot air was caused to blow to the nozzle by adjusting the air blowing amount by a fan (not illustrated) so as to keep the average wind speed of 3 m/s at a position away from the air blowing nozzle by 2 m, and the wind speed measurement was performed at the position of 2 m on the downstream side of the air blowing nozzle inside the hot air treatment chamber. Further, total seven measurement positions of 265 mm, 365 mm, 705 mm, 1145 mm, 1585 mm, 1925 mm, and 2025 mm were set at the downstream position of 2 m in the length direction of the air blowing nozzle based on the hot air inlet. The wind speed measurement was performed ten times at each of the measurement positions, and the average was set as the wind speed value at each of the positions. Further, the average wind speed and the wind speed distribution were calculated in the respective conditions at seven points in the nozzle length direction using the wind speed value.

As a result, as listed in Table 1, the result was satisfactory such that a variation in wind speed in the nozzle length direction was ±5%.

Example 2

The wind speed was measured as in Example 1 except that the displacement amount of the openings of the respective centers of the porous plate and the honeycomb (the rectifying member) was 1.5 mm when the openings overlapped each other on the same plane. As listed in Table 1, the result was satisfactory such that a variation in wind speed in the nozzle length direction was ±5%.

Example 3

In the hot air blowing nozzle illustrated in FIG. 3, the nozzle length L was set as 1850 mm, the width w of the hot air inlet was set as 375 mm, the distance x between the tip of the direction changing plate and the porous plate was set as 10 mm, and the equivalent diameter d of the porous plate was set as 14 mm. At this time, the ratio w/L of the width w of the hot air inlet with respect to the length L of the hot air blowing nozzle was set as 0.20, and the ratio x/L of the distance x between the tip of the direction changing plate and the porous plate with respect to the length L of the hot air blowing nozzle was set as 0.005.

Further, a stainless honeycomb (having a trade name "SH-01100-16", an opposite side dimension of 16 mm, a plate thickness of 0.1 mm, and a depth of 80 mm) manufactured by San Technology, Inc. was used as the rectifying member. That is, the ratio A/B was 4.3%. At this time, the opening pitch P1 of the holes of the porous plate illustrated in FIG. 4 was set as the pitch of 13.9 mm equal to the opening pitch P2 of the stainless honeycomb. At this time, the rate of hole area of the porous plate was 29%. Further, the center positions of the openings of the porous plate and the rectifying member were adjusted so as to match one another when the porous plate and the rectifying member overlapped each other. Furthermore, the porous plate and the rectifying member were closely attached to each other so that the gap y became 0 mm.

Hot air was caused to blow to the nozzle by adjusting the air blowing amount by a fan (not illustrated) so as to keep the average wind speed of 3 m/s at a position away from the air blowing nozzle by 2 m, and the wind speed measurement was performed at the position of 2 m on the downstream side of the air blowing nozzle. Further, total seven wind speed measurement positions of 100 mm, 247 mm, 594 mm, 941 mm, 1288 mm, 1635 mm, and 1750 mm were set at the downstream position of 2 m in the length direction of the air blowing nozzle based on the hot air inlet. The wind speed measurement was performed ten times at each of the measurement positions, and the average was set as the wind speed value at each of the positions. Further, the average wind speed and the wind speed distribution were calculated in the respective conditions at seven points in the nozzle length direction using the wind speed value.

As listed in Table 1, the result was satisfactory such that a variation in wind speed in the nozzle length direction was ±9%.

Example 4

The wind speed was measured as in Example 3 except that the horizontal displacement amount z of the respective centers when the openings of the porous plate and the rectifying member overlapped each other on the same plane was set as 1 mm. As listed in Table 1, the result was satisfactory such that a variation in wind speed in the nozzle length direction was ±9%.

The conditions in Examples 1 to 4 all satisfied the numerical ranges of claim, and a variation in wind speed distribution was satisfactory. Thus, air was caused to uniformly flow into the respective honeycomb holes by appropriately setting the pressure loss of the porous plate, the inclination of the direction changing plate, and the arrangement relation between the porous plate and the honeycomb, and the wind speed distribution became uniform by the linear advancing property in a direction parallel to running direction of the precursor fiber by the passage of the air through a predetermined length of the honeycomb. Further, compared to Examples 1 and 3, in Examples 2 and 4, the respective centers of the openings of the porous plate and the rectifying member when the porous plate and the rectifying member overlapped each other on the same plane within the range satisfying claim 2 were displaced from each other, but there was no influence on a variation in wind speed.

Example 5

The wind speed was measured as in Example 1 except that the width w of the hot air inlet was set as 1200 mm, that is, the ratio (w/L) was set as 0.59. As listed in Table 1, the result was satisfactory such that a variation in wind speed in the nozzle length direction became ±10%.

Example 6

The wind speed was measured as in Example 5 except that the distance x between the tip of the direction changing plate and the porous plate was set as 80 mm, that is, the ratio x/L was set as 0.039%. As listed in Table 1, the result was satisfactory such that a variation in wind speed in the nozzle length direction became ±9%.

Example 5 is out of the range of the condition (9) in that the inlet width of the hot air blowing nozzle is increased, and Example 6 is out of the ranges of the conditions (8) and (9) in that the distance between the porous plate and the direction changing plate at the tip of the nozzle is increased. In all examples, the wind speed distribution was satisfactory, but there was a tendency that a variation in wind speed increased compared to Example 1 satisfying all claims.

Example 7

The wind speed measurement was performed as in Example 1 except that the horizontal displacement distance between the center of the circumscribed circle and the center of the porous plate was set as 4 mm when the openings of the porous plate and the rectifying member overlapped each other on the same plane in a state where the opening pitch P1 of the holes of the porous plate was set as the pitch of 22.5 mm equal to the opening pitch P2 of the stainless honeycomb. As listed in Table 1, the result was satisfactory such that a variation in wind speed in the nozzle length direction became ±16%.

In Example 7, since a drift is generated inside the honeycomb when the hole center of the porous plate and the center of the circumscribed circle are displaced from each other in the horizontal direction while the openings of the porous plate and the rectifying member overlap each other on the same plane, there is a tendency that the value of a variation in wind speed increases compared to Example 1.

Example 8

The wind speed was measured as in Example 1 except that the gap y between the facing opening surfaces between the porous plate and the honeycomb as the rectifying member was set as 5 mm. As listed in Table 1, the result was satisfactory such that a variation in wind speed in the nozzle length direction became ±15%.

Example 9

The wind speed was measured as in Example 1 except that the gap y between the facing opening surfaces between the porous plate and the honeycomb as the rectifying member was set as 10 mm. As listed in Table 1, the result was satisfactory such that a variation in wind speed in the nozzle length direction became ±20%.

Example 8 is within the range of the condition (7) and Example 9 is out of the range of the condition (7) since the distance between the porous plate and the honeycomb is increased. The stream line that flows from the hot air inlet and passes through the porous plate is inclined toward the nozzle tip in the running direction of the precursor fiber. Accordingly, when the distance between the porous plate and the honeycomb is large, the air dose not uniformly flow into the respective honeycomb hole, and the wind speed at the nozzle tip becomes fast, so that a variation in wind speed increases.

Comparative Example 1

The wind speed measurement was performed as in Example 1 except that the hole diameter d of the porous plate was set as 18 mm and the rate of hole area was set as 37%. As listed in Table 1, a variation in wind speed was large such that a variation in wind speed in the nozzle length direction was ±45%.

Comparative Example 1 is out of the range of the condition (2) since the rate of hole area is large. When the rate of hole area increases too much, the wind speed of the air blowing from the hot air blowing nozzle tip increases, and hence the wind speed distribution is largely degraded.

Comparative Example 2

A stainless honeycomb (having a trade name "SH-01100-26", an opposite side dimension of 26 mm, a plate thickness of 0.1 mm, and a depth of 100 mm) manufactured by San Technology, Inc. was used as the rectifying member. That is, the ratio A/B was 3.3%. The wind speed measurement was performed as in Example 1 in the other conditions. As listed in Table 1, a variation in wind speed was large such that a variation in wind speed in the nozzle length direction was ±25%.

Comparative Example 3

A stainless honeycomb (having a trade name "SH-01100-16", an opposite side dimension of 16 mm, a plate thickness of 0.1 mm, and a depth of 50 mm) manufactured by San Technology, Inc. was used as the rectifying member. That is, the ratio A/B was 2.7%. The wind speed measurement was performed as in Example 3 in the other conditions. As listed in Table 1, a variation in wind speed was large such that a variation in wind speed in the nozzle length direction was ±35%.

Comparative Examples 2 and 3 are within the range of the condition (1) since the hot air passage distance of the honeycomb is short. When the hot air passage distance of the honeycomb is too short, the hot air blows as the gradient stream at the blowing port of the hot air blowing nozzle, and hence a variation in wind speed increases as illustrated in Comparative Examples 2 and 3. Thus, it is desirable that the ratio A/B of the hot air passage distance of the rectifying member with respect to the distance between the opposite sides of the honeycomb member or the lattices of the rectifying member be 4.0 times or more.

TABLE 1

|  | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|
| EQUIVALENT | | | | | | | |
| CORRESPONDING DIAMETER d (mm) OF POROUS PLATE | 12 | 12 | 14 | 14 | 12 | 12 | 12 |
| OPENING RATIO •(−) OF POROUS PLATE RATE OF HOLE AREA | 0.17 | 0.17 | 0.29 | 0.29 | 0.17 | 0.17 | 0.17 |
| HOT AIR PASSAGE DISTANCE A (mm) OF RECTIFYING MEMBER | 145 | 145 | 80 | 80 | 145 | 145 | 145 |
| HORIZONTAL MAXIMUM DISTANCE B (mm) OF RECTIFYING MEMBER | 30 | 30 | 18.5 | 18.5 | 30 | 30 | 30 |
| A/B | 4.8 | 4.8 | 4.3 | 4.3 | 4.8 | 4.8 | 4.8 |
| OPENING PITCH P1 (mm) OF POROUS PLATE | 22.5 | 22.5 | 13.9 | 13.9 | 22.5 | 22.5 | 22.5 |
| OPENING PITCH P2 (mm) OF RECTIFYING MEMBER | 22.5 | 22.5 | 13.9 | 13.9 | 22.5 | 22.5 | 22.5 |
| P1/P2 | 1.0 | 1.0 | 1.0 | 1.0 | 1.0 | 1.0 | 1.0 |
| HORIZONTAL DISPLACEMENT AMOUNT z (mm) OF POROUS PLATE AND RECTIFYING MEMBER | 0.0 | 1.5 | 0.0 | 1.0 | 0.0 | 0.0 | 4.0 |
| GAP y (mm) OF POROUS PLATE AND RECTIFYING MEMBER | 0 | 0 | 0 | 0 | 0 | 0 | 0 |
| NOZZLE LENGTH L(mm) | 2050 | 2050 | 1850 | 1850 | 2050 | 2050 | 2050 |
| DISTANCE x (mm) BETWEEN TIP OF BACK SURFACE PLATE AND POROUS PLATE | 50 | 50 | 10 | 10 | 50 | 80 | 50 |
| x/L | 0.024 | 0.024 | 0.005 | 0.005 | 0.024 | 0.039 | 0.024 |
| INLET WIDTH w (mm) | 700 | 700 | 375 | 375 | 1200 | 1200 | 700 |
| w/L | 0.34 | 0.34 | 0.20 | 0.20 | 0.59 | 0.59 | 0.34 |
| WIND SPEED DISTRIBUTION (•%) AT 2 m ON DOWNSTREAM SIDE OF BLOWING NOZZLE | 5 | 5 | 9 | 9 | 10 | 9 | 16 |

|  | EXAMPLE 8 | EXAMPLE 9 | COMPARATIVE EXAMPLE 1 | COMPARATIVE EXAMPLE 2 | COMPARATIVE EXAMPLE 3 |
|---|---|---|---|---|---|
| EQUIVALENT | | | | | |
| CORRESPONDING DIAMETER d (mm) OF POROUS PLATE | 12 | 12 | 18 | 12 | 14 |
| OPENING RATIO •(−) OF POROUS PLATE RATE OF HOLE AREA | 0.17 | 0.17 | 0.37 | 0.17 | 0.29 |
| HOT AIR PASSAGE DISTANCE A (mm) OF RECTIFYING MEMBER | 145 | 145 | 145 | 100 | 50 |
| HORIZONTAL MAXIMUM DISTANCE B (mm) OF RECTIFYING MEMBER | 30 | 30 | 30 | 30 | 18.5 |
| A/B | 4.8 | 4.8 | 4.8 | 3.3 | 2.7 |
| OPENING PITCH P1 (mm) OF POROUS PLATE | 22.5 | 22.5 | 22.5 | 22.5 | 13.9 |
| OPENING PITCH P2 (mm) OF RECTIFYING MEMBER | 22.5 | 22.5 | 22.5 | 22.5 | 13.9 |
| P1/P2 | 1.0 | 1.0 | 1.0 | 1.0 | 1.0 |
| HORIZONTAL DISPLACEMENT AMOUNT z (mm) OF POROUS PLATE AND RECTIFYING MEMBER | 0.0 | 0.0 | 0.0 | 0.0 | 0.0 |
| GAP y (mm) OF POROUS PLATE AND RECTIFYING MEMBER | 5 | 10 | 0 | 0 | 0 |
| NOZZLE LENGTH L(mm) | 2050 | 2050 | 2050 | 2050 | 1850 |
| DISTANCE x (mm) BETWEEN TIP OF BACK SURFACE PLATE AND POROUS PLATE | 50 | 50 | 50 | 50 | 10 |
| x/L | 0.024 | 0.024 | 0.024 | 0.024 | 0.005 |
| INLET WIDTH w (mm) | 700 | 700 | 700 | 700 | 375 |
| w/L | 0.34 | 0.34 | 0.34 | 0.34 | 0.20 |
| WIND SPEED DISTRIBUTION (•%) AT 2 m ON DOWNSTREAM SIDE OF BLOWING NOZZLE | 15 | 20 | 45 | 25 | 35 |

EXPLANATIONS OF LETTERS OR NUMERALS

1: flame-resistant heat treatment furnace
2: heat treatment chamber
3: guide roll
4: hot air blowing nozzle
5: hot air suctioning nozzle
6: hot air heater
7: air blower
8: circulation duct
9a: first guide port
9b: second guide port
10: precursor fiber strand
40: hot air inlet
41: direction changing plate
42: porous plate
43: rectifying member

The invention claimed is:

1. A flame-resistant heat treatment furnace comprising:
   a heat treatment chamber configured to cause hot air to flow in the same direction as a running direction of a precursor fiber strand, the direction opposite to the running direction of the precursor fiber strand, or both, and heats the precursor fiber strand;
   a hot air blowing nozzle configured to introduce the hot air into the heat treatment chamber; and a hot air suctioning nozzle that is installed at a position away from the hot air blowing nozzle and suctions the hot air, wherein the hot air blowing nozzle comprises a porous plate and a rectifying member that satisfy conditions (1) to (3):

(1) $A/B \geq 4.0$;
(2) $0.15 \geq \alpha \leq 0.35$; and
(3) $0 \leq B-d \leq 20$;

where
- A is a hot air passage distance (mm) of the rectifying member,
- B is a horizontal maximum distance (mm) of one opening of the rectifying member,
- $\alpha$ is a rate of hole area of the porous plate, and
- d is an equivalent diameter (mm) of the porous plate.

2. The flame-resistant heat treatment furnace according to claim 1, wherein the equivalent diameter d (mm) of the porous plate satisfies a condition (5) of $10 \leq d \leq 20$.

3. The flame-resistant heat treatment furnace according to claim 1,
wherein an opening pitch P1 (mm) of openings of the porous plate and an opening pitch P2 (mm) of openings of the rectifying member satisfy a condition (6) of $0.995 \times P2 \leq P1 \leq 1.005 \times P2$.

4. The flame-resistant heat treatment furnace according to claim 1,
wherein a distance y (mm) between the facing opening surfaces of the porous plate and the rectifying member satisfies a condition (7) of $0 \leq y \leq 7$.

5. The flame-resistant heat treatment furnace according to claim 1,
wherein a cross-sectional shape of the rectifying member in the hot air passage direction is a lattice shape or a honeycomb shape.

6. The flame-resistant heat treatment furnace according to claim 1,
wherein the porous plate and the rectifying member are connected to each other by a positioning member.

7. The flame-resistant heat treatment furnace according to claim 1,
wherein the porous plate and the rectifying member are detachable from each other.

8. The flame-resistant heat treatment furnace according to claim 1,
wherein the hot air blowing nozzle comprises a direction changing plate that changes a hot air flow direction, and satisfies a condition (8) of $(x/L)<0.030$ and a condition (9) of $(w/L)<0.50$,
where x is a distance (mm) between the porous plate at a nozzle tip and the direction changing plate at the nozzle tip, L is an entire length (mm) of the hot air blowing nozzle in the depth direction, and w is an inlet width (mm) of the hot air blowing nozzle.

9. The flame-resistant heat treatment furnace according to claim 1,
wherein an installation position of the porous plate is adjustable.

10. A method of manufacturing a carbon fiber comprising: heating a carbon fiber precursor strand within a flame-resistant heat treatment furnace according to claim 1.

11. The flame-resistant heat treatment furnace according to claim 1, wherein the hot air blowing nozzle comprises a porous plate and a rectifying member that further satisfy condition (4):

(4) 80% or more of an area of one opening of the porous plate when causing facing surfaces of the porous plate and the rectifying member to overlap each other is included in one opening of the rectifying member.

12. The flame-resistant heat treatment furnace according to claim 1, wherein $$10 \geq A/B \, 4.0. \tag{1}$$

13. The flame-resistant heat treatment furnace according to claim 1, wherein $$7 \geq A/B \, 4.0. \tag{1}$$

14. The flame-resistant heat treatment furnace according to claim 1, wherein $$5 \geq A/B \, 4.0. \tag{1}$$

15. The flame-resistant heat treatment furnace according to claim 1, wherein $$0.15 \leq \alpha \leq 0.30. \tag{2}$$

16. The flame-resistant heat treatment furnace according to claim 1, wherein $$0.15 \leq \alpha \leq 0.25. \tag{2}$$

17. The flame-resistant heat treatment furnace according to claim 1, wherein $$0.17 \leq \alpha \leq 0.35. \tag{2}$$

18. The flame-resistant heat treatment furnace according to claim 1, wherein $$0.17 \leq \alpha \leq 0.30. \tag{2}$$

19. The flame-resistant heat treatment furnace according to claim 1, wherein $$0.17 \leq \alpha \leq 0.25. \tag{2}$$

20. The flame-resistant heat treatment furnace according to claim 1, wherein the heat treatment chamber causes the hot air to flow in the same direction as the running direction of the precursor fiber strand and in the direction opposite to the running direction of the precursor fiber strand.

* * * * *